US012627748B1

(12) United States Patent
Bhatnagar et al.

(10) Patent No.: US 12,627,748 B1
(45) Date of Patent: May 12, 2026

(54) CONTENT DELIVERY NETWORK CACHING RULES UPDATE VALIDATOR

(71) Applicant: Amazon Technologies, Inc., Seattle, WA (US)

(72) Inventors: Abhijit Prakash Bhatnagar, Bellevue, WA (US); Eric Villiers, Las Vegas, NV (US); Yusof Ganji, Bellevue, WA (US); Yuchao Bai, Seattle, WA (US); Jay Shah, Lynnwood, WA (US); Ming Luo, Kenmore, WA (US); Evan Corriere, Sunnyvale, CA (US); Navid Oskouipour, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 18/615,910

(22) Filed: Mar. 25, 2024

(51) Int. Cl.
| | |
|---|---|
| *G06F 15/16* | (2006.01) |
| *H04L 45/302* | (2022.01) |
| *H04L 67/568* | (2022.01) |

(52) U.S. Cl.
CPC .......... *H04L 67/568* (2022.05); *H04L 45/306* (2013.01)

(58) Field of Classification Search
CPC ............................ H04L 67/568; H04L 45/306
USPC ........................................................ 709/217
See application file for complete search history.

(56) References Cited

U.S. PATENT DOCUMENTS

| | | | | |
|---|---|---|---|---|
| 6,408,360 | B1 * | 6/2002 | Chamberlain ...... | G06F 16/9574 711/124 |
| 9,549,040 | B2 * | 1/2017 | Anand ................ | H04L 67/5682 |

| | | | | |
|---|---|---|---|---|
| 9,912,631 | B2 * | 3/2018 | Bergman .............. | H04L 65/612 |
| 10,171,610 | B2 * | 1/2019 | Yang ........................ | H04L 67/02 |
| 10,425,697 | B2 * | 9/2019 | April .................. | H04N 21/4788 |
| 10,637,823 | B2 * | 4/2020 | Bergman .............. | H04L 65/612 |
| 10,805,687 | B2 * | 10/2020 | April ..................... | H04L 65/752 |
| 10,887,419 | B2 * | 1/2021 | Anand ................ | H04L 67/5682 |
| 11,039,218 | B1 * | 6/2021 | April .................. | H04N 21/8456 |
| 11,349,805 | B2 * | 5/2022 | Bergman .............. | H04L 67/568 |
| 11,356,742 | B2 * | 6/2022 | Azuolas ................ | H04L 65/611 |
| 11,770,591 | B2 * | 9/2023 | April ....................... | H04L 65/80 709/231 |
| 11,871,088 | B2 * | 1/2024 | Azuolas ............. | H04N 21/2368 |
| 12,389,080 | B2 * | 8/2025 | April ..................... | H04L 65/752 |
| 12,423,106 | B2 * | 9/2025 | Al-Otoom ............. | G06F 9/3848 |

* cited by examiner

*Primary Examiner* — Alicia Baturay

(74) *Attorney, Agent, or Firm* — Knobbe, Martens, Olson & Bear, LLP

(57) ABSTRACT

A cache validation system receives Content Delivery Network (CDN) caching rules and a request log, such as a log of HTTP requests received by a CDN. The cache validation system generates test requests from the CDN caching rules and the request log. In a testing environment, the cache validation system determines one or more cache validation indicators, such as, but not limited to, a hit-to-miss value, from the test requests and the CDN caching rules before application of a proposed change to a CDN caching rule. The cache validation system applies the proposed change to the CDN caching rules in the testing environment. The cache validation system determines one or more updated cache validation indicators from the test requests for the CDN caching rules after application of the proposed change. If the initial and updated cache validation indicator(s) satisfy a threshold, then the cache validation system can provide a notification.

20 Claims, 6 Drawing Sheets

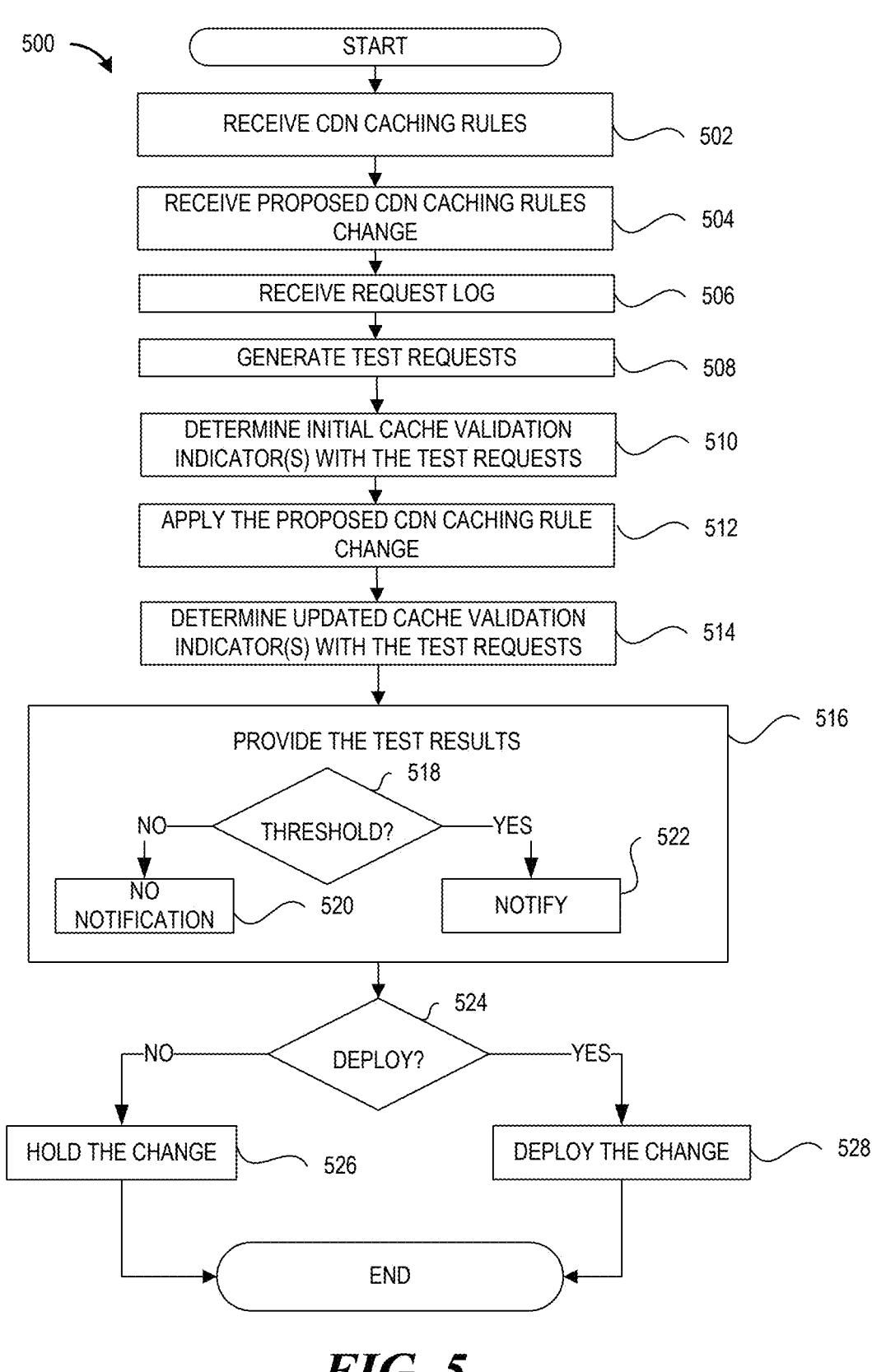

500

START

RECEIVE CDN CACHING RULES — 502

RECEIVE PROPOSED CDN CACHING RULES CHANGE — 504

RECEIVE REQUEST LOG — 506

GENERATE TEST REQUESTS — 508

DETERMINE INITIAL CACHE VALIDATION INDICATOR(S) WITH THE TEST REQUESTS — 510

APPLY THE PROPOSED CDN CACHING RULE CHANGE — 512

DETERMINE UPDATED CACHE VALIDATION INDICATOR(S) WITH THE TEST REQUESTS — 514

PROVIDE THE TEST RESULTS — 516

518

NO  THRESHOLD?  YES

NO NOTIFICATION — 520

NOTIFY — 522

524

NO  DEPLOY?  YES

HOLD THE CHANGE — 526

DEPLOY THE CHANGE — 528

END

*FIG. 5*

CONTENT DELIVERY NETWORK CACHING RULES UPDATE VALIDATOR

BACKGROUND

A content delivery network (CDN) can refer to a geographically distributed group of computing devices that work together to deliver network content. Points of presence (PoPs) in a CDN refers to servers that are strategically located near client devices, such as being placed near high-density network exchange points. The servers in a CDN can provide content using the Hypertext Transfer Protocol (HTTP), an application layer protocol. A CDN cache can refer to data storage that stores content (such as network responses) to reduce response latency and/or reduce load on an origin server. CDNs can store redacted logs that record portions of requests and responses. CDN caching rules can define matching conditions for a cache hit. An error in the CDN caching rules can cause incorrect content to be served to clients.

BRIEF DESCRIPTION OF THE DRAWINGS

These and other features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

FIG. 5 is a flow chart depicting a method implemented by the cache validation system for validating proposed updates to CDN caching rules for a CDN cache.

DETAILED DESCRIPTION

Figure 1:
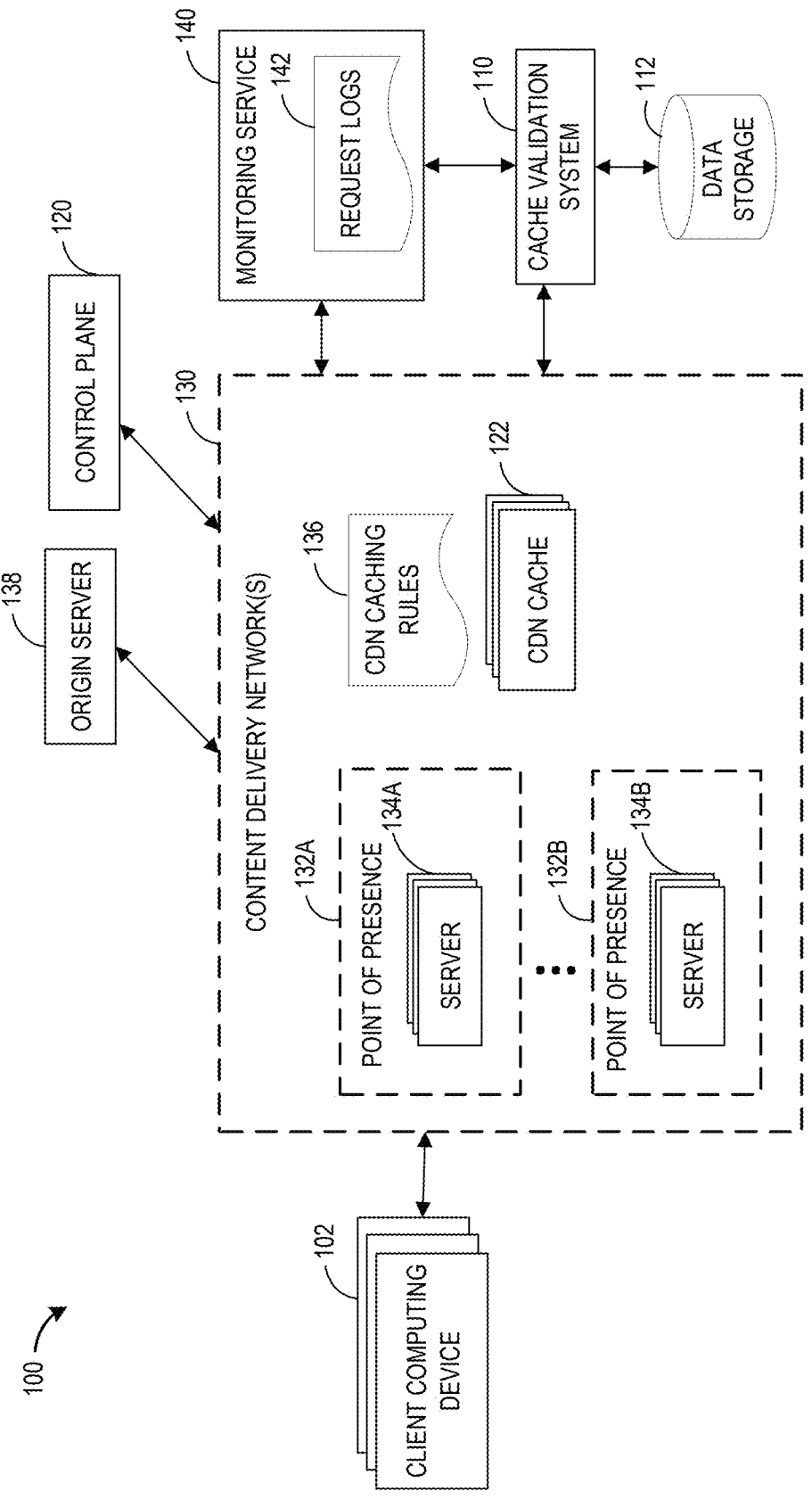
FIG. 1 is a schematic block diagram depicting an environment including a cache validation system 110 that can validate proposed updates to CDN caching rules for a CDN cache.

As described above, CDN caches apply CDN caching rules to incoming requests. CDN caches can match incoming requests to cache keys in the CDN cache. If there is a hit, a cached response exists and has not expired, then the CDN cache and the CDN can return the cached response. CDN caching rules can be updated over time. For example, a CDN operator can push an update to a caching rule. As described herein, if there is an error in the CDN caching rules, then incorrect content can be served to clients. Such errors may be deployed and can be difficult to detect before deployment with existing approaches. A service can store logs that record portions of requests and responses received by the CDN. The logs are typically redacted (such as by not recording all the request parameters) to preserve confidentiality. From reviewing the redacted CDN logs, it can be technically challenging (or even impossible) for a CDN operator to determine if a change to CDN caching rules resulted in an undesirable change in how responses are being cached.

Generally described, aspects of the present disclosure are directed to systems and methods for testing proposed updates to CDN caching rules before such changes are deployed. As described herein, a CDN caching rule can define matching conditions (such as matching on headers, cookies, query strings, etc.) for a cache hit. A cache validation system can receive CDN caching rules and/or request logs. The cache validation system can generate test requests from the retrieved CDN caching rules and the request logs. The cache validation system can determine one or more cache validation indicators, such as, but not limited to, a hit-to-miss value, from the test requests and the CDN caching rules before application of a proposed change to a CDN caching rule. The cache validation system can apply the proposed change to the CDN caching rules in a testing environment. The cache validation system can determine one or more updated cache validation indicators, such as, but not limited to, a hit-to-miss value, from the test requests for the CDN caching rules after application of the proposed change. If the initial and updated cache validation indicator(s) satisfy a threshold, then the cache validation system can provide a notification. For example, a CDN operator can receive the notification and be warned that a proposed change may result in an undesirable change in how requests are cached. The CDN operator can review the notification and decide whether to approve or reject the proposed CDN caching rules change. The approval or rejection can cause the CDN caching rules change to be deployed or to not be deployed, respectively, to a CDN.

As used herein, the term "CDN caching rule" can refer to a cache configuration that affects a hit-to-miss ratio of a CDN cache. As described herein, a cache key (which can be referred to as a request signature) can be a unique identifier for every object (which can be referred to as content, such as a response) in the cache, and it can determine whether request results in a cache hit. A cache hit occurs when a request generates the same cache key as a prior request, and the object for that cache key is in the cache and valid. When there is a cache hit, the object can be served to the client computing device, which can have the following benefits: reduced load on the origin server and reduced latency for the client computing device. A CDN caching rule can be a policy that controls the values (such as query strings, HTTP headers, cookies, etc.) that are included in the cache key. In some embodiments, a default CDN caching rule can cause a default cache key to include a domain name and a resource locator path for the requested object. CDN caching rules can be changed over time. As described herein, a change to a CDN caching rule can have unexpected behavior, such as causing a network page not to work properly if the incorrect content is served back to the client computing device. Additional details with respect to CDN caching rules are described herein, such as with respect to FIGS. 2, 4A.

Turning to FIG. 1, an illustrative environment 100 is shown. The components of the environment 100 can enable testing proposed updates to CDN caching rules before such changes are deployed. As described herein, existing approaches may be unable to detect errors in CDN caching rules before they are deployed. The environment 100 can include one or more client computing devices 102, a cache validation system 110, a data storage 112, a CDN 130, an origin server 138, a control plane 120, and a monitoring service 140. The CDN 130 can include PoPs 132A, 132B, CDN caching rules 136, and a CDN cache 122. The PoPs 132A, 132B can include servers 134A, 134B respectively. The constituents of the environment 100 may be in communication with each other either locally or over one or more networks. A POP can include a collection of devices, such as servers 134A, 134B, routers, and/or switches that collectively reflect a demarcation point between two or more networks.

Client computing devices 102 can include, but are not limited to, a laptop or tablet computer, personal computer, personal digital assistant (PDA), hybrid PDA/mobile phone, smart wearable device (such as a smart watch), mobile phone, a smartphone, set-top or other television box, television or smart television, and/or video-game console or other gaming device. A user can use a client application on the client computing device 102, such as a media player application or a web browser application. A client computing device 102 can include any computing device that requests a response from a PoP 132A, 132B in the CDN 130.

The client computing device 102 can request a resource via a HTTP request, such as an HTTP GET method, and/or a resource locator (such as a uniform resource locator (URL)). The resource locator can include several components, such as a domain name, a path, and a query string. An HTTP request can include an HTTP header, which can allow the client and server to pass additional information (such as cookies) with an HTTP request or response. A network can route the resource request to a particular PoP 132A, 132B in a CDN 130. In some embodiments, there can be multiple CDNs 130. The POP 132A, 132B that receives the request can check with the control plane 120 if a valid cached copy of the response for the request is available. The CDN caches 122 can be located within the Pops 132A, 132B. The control plane 120 can determine if there is a cache hit or miss with the CDN caching rules 136. A CDN caching rule 136 can specify a request signature, which can also be referred to as a cache key. The CDN caching rule 136 can include elements of an HTTP request (such as headers, cookies, query strings, etc.) to match a particular request. The control plane 120 can check to see if there is a cache hit or miss with the CDN caching rules 136 and the CDN cache 122. If there is a cache hit, the control plane 120 provides the cached response to the PoP 132A, 132B that requested the resource. The control plane 120 can inform the POP 132A, 132B if there is a cache miss. If there is a miss, the POP 132A, 132B requests the resource from the origin server 138 and the resource can be stored in the CDN cache 122. As used herein, the terms "resource," "content," "response," and "object," can be used interchangeably.

A monitoring service 140 can monitor the CDN 130. In particular, the monitoring service 140 can monitor the requests that the CDN 130 receives from client computing devices 102. The monitoring service 140 can record those requests in the request logs 142. The request logs 142 can be redacted. The monitoring service 140 can store redacted request logs 142 to preserve confidentiality (such as by not recording all the request parameters). For example, the monitoring service 140 can store redacted values for security headers, cookie values, etc., in the redacted request logs 142.

The cache validation system 110 can receive the CDN caching rules 136 and the request logs 142. The cache validation system 110 can receive a proposed change to a CDN caching rule 136. Before the change is implemented at the CDN 130, the cache validation system 110 can generate test requests based at least in part on the CDN caching rules 136 and/or the request logs 142 and store the test requests in the data storage 112.

The cache validation system 110 can determine one or more cache validation indicators, such as, but not limited to, a hit-to-miss value (which can be a ratio), based at least in part on the test requests and the CDN caching rules 136 before application of the proposed change. The cache validation system 110 can apply the proposed change to the CDN caching rules in a testing environment. The cache validation system 110 can determine one or more updated cache validation indicators, such as, but not limited to, a hit-to-miss ratio, from the test requests for the CDN caching rules after application of the proposed change. If the updated cache validation indicator(s) satisfy a threshold, then the cache validation system 110 can provide notification, such as an alert. In some embodiments, a CDN operator can receive the alert. The CDN operator can review the alert and decide whether to approve or reject the proposed change to the CDN caching rules 136. In some embodiments, the approval or rejection can cause the change to the CDN caching rules 136 to be deployed or to not be deployed, respectively, to the CDN 130.

The data storage 112 may be embodied in hard disk drives, solid state memories, or any other type of non-transitory computer readable storage medium. The data storage 112 may also be distributed or partitioned across multiple local and/or remote storage devices. The data storage 112 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

While not shown, the network may be any wired network, wireless network, or combination thereof. In addition, the network may be a personal area network, local area network, wide area network, cable network, satellite network, cellular telephone network, or combination thereof. In addition, the network may be an over-the-air broadcast network (e.g., for radio or television) or a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long-Term Evolution (LTE) network, or any other type of wireless network. The network can use protocols and components for communicating via the Internet or any of the other aforementioned types of networks, such as HTTP, TCP/IP, and/or UDP/IP.

In some embodiments, the CDN 130 and/or the cache validation system 110 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
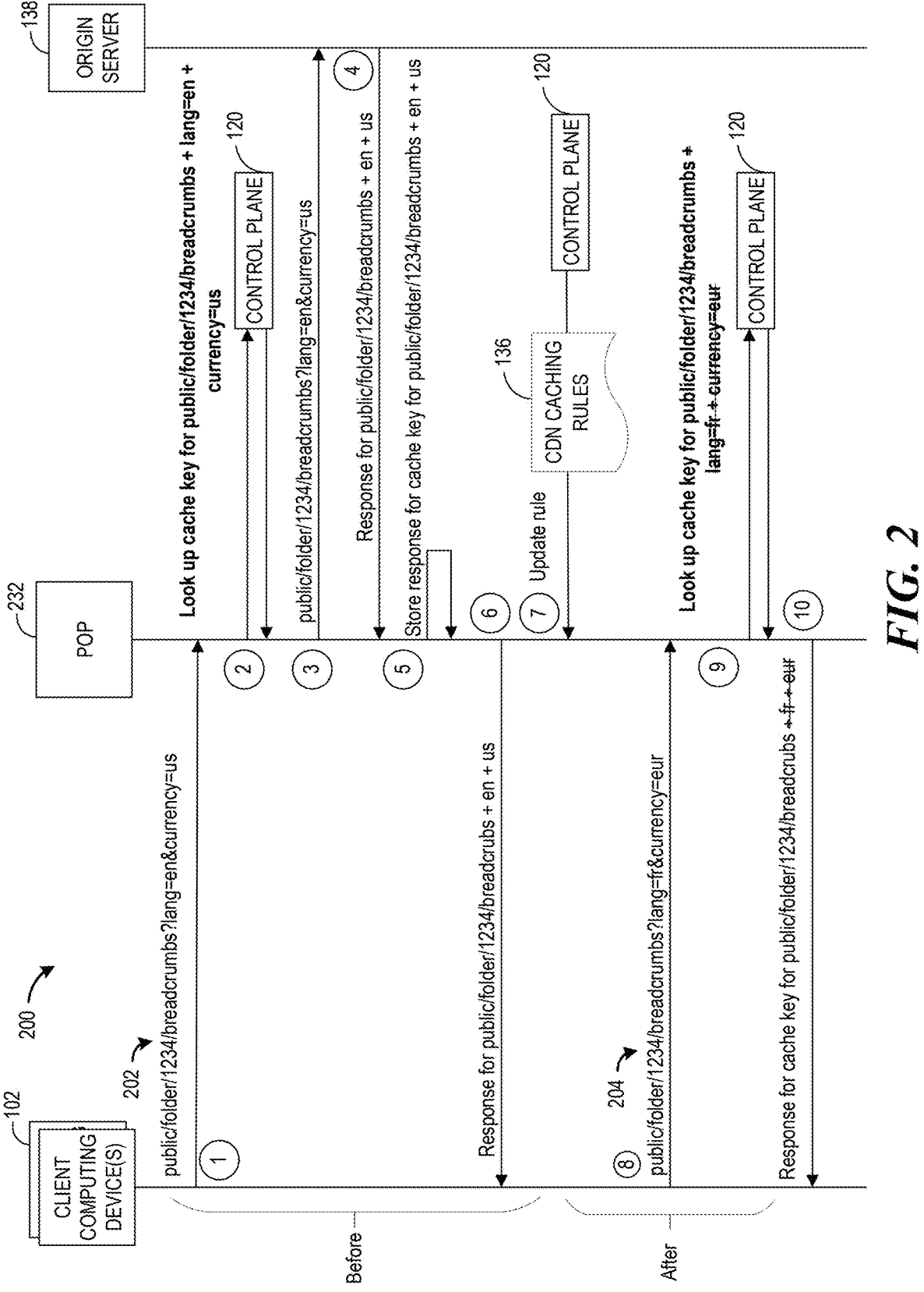
FIG. 2 is a schematic block diagram depicting network messages and state between a client computing device, a control plane, and an origin server referenced in the environment depicted in FIG. 1.

FIG. 2 is a schematic block diagram depicting an environment 200 including network messages and state between the client computing devices 102, a PoP 232, the control plan 120, and the origin server 138. The network messages and state of the components of the environment 200 can illustrate how updates to the CDN caching rules 136 can cause incorrect content to be served to clients. The environment 200 can include the client computing devices 102, the POP 232, the origin server 138, and the CDN caching rules 136.

At one (1), a first client computing device 102 can request content from the PoP 232 with a first resource locator 202. The first resource locator 202 can include a path and a query string (here "public/folder/1234/breadcrumbs?lang=en&currency=us"). The POP 232 can receive the first request.

At two (2), the POP 232, via a control plane 120, can look up a first cache key for the first request. The control plane 120 with the CDN caching rules 136 can look up a cached response in the CDN cache 122 (not illustrated) for the first request, where the first request can include a resource locator with a path (here "public/folder/1234/breadcrumbs") and query string parameters (here "lang=en" and "currency=us"). As shown in bold, the CDN caching rules 136 can specify that the cache key lookup includes the query string parameters in this case. The control plane 120 may not find a cached response in the CDN cache 122 for the first cache key, which can be referred to as a cache miss.

At three (3), the POP 232 can request the content from the origin server 138. At four (4), the origin server 138 can provide the response for the first request. At five (5), the PoP 232, via the control plane 120, can store the response in the CDN cache 122 for the corresponding cache key. At six (6), the POP 232 can provide the first response to the first client computing device 102. As described herein, the first client computing device 102 can present the response in a user interface, such as a web browser application. One (1) through six (6) may occur before updated CDN caching rules 136 are deployed to the POP 232 at seven (7).

At seven (7), updated CDN caching rules 136 can be deployed. The control plane 120 can deploy the updated CDN caching rules to the POP 232. An example change in the CDN caching rules 136 can include an updated CDN caching rule that causes query strings to be omitted from the cache key, which can be an error for applications that rely on query strings. Accordingly, incorrect user interface behavior can result, such as, but not limited to, incorrect page translation, currency information, and/or preventing users from going beyond a first page of initial search results.

For example, at eight (8), a second client computing device 102 can request content from the POP 232 with a second resource locator 204. The second resource locator 204 can include a path and a query string (here "public/folder/1234/breadcrumbs?lang=fr&currency=cur"). The POP 232 can receive the second request.

At nine (9), the PoP 232, via the control plane 120, can look up a second cache key for the second request. The control plane 120 with the updated CDN caching rules 136 can look up a cached response in the CDN cache 122 for the second request. As shown, based on the updated CDN caching rules, the second cache key for the second request can include a resource locator with a path (here "public/folder/1234/breadcrumbs") but may exclude query string parameters (here "lang=fr" and "currency=cur"). As shown in bold, the updated CDN caching rules 136 can specify that the cache key lookup excludes the query string parameters in this case. The control plane 120 can find a cached response in the CDN cache 122 for the second cache key, which can be referred to as a cache hit. However, since the second cache key omitted query string parameters, the cached response may be incorrect (such as having text in the incorrect language, incorrect currency, and/or incorrect pagination results).

At ten (10), the POP 232 can provide the second response to the second client computing device 102. As described herein, the second client computing device 102 can present the second response in a user interface, which can include one or more errors. Eight (8) through ten (10) may occur after the change to the CDN caching rules 136 at seven (7).

The systems and methods described herein may improve CDN caching technology and computer networking technology. As described herein, changes to CDN caching rules can have unexpected results, such as users being presented with errors in network page content. CDNs can be large distributed systems with many backend services, such as a globally vastly distributed system with hundreds of thousands of backend services. A CDN caching rules change by one service owner can have an effect on other service owners since those service owners can share the same CDN caches. Also, as described herein, due to CDN logs being redacted, it can be challenging (or even impossible) for a CDN operator to review the redacted CDN logs to determine if a change to CDN caching rules resulted in an undesirable change in how responses are being cached. Moreover, in some embodiments, multiple CDNs can be used (such as different CDNs from different CDN providers) that share the same CDN caches. Thus, determining the overall impact of a single CDN rules change can be technically challenging. In some aspects, the systems and methods described herein can use one or more techniques to preemptively estimate the impact of a proposed CDN cache rules change before such a change is deployed. The cache validation system 110 can thus provide a notification to a CDN operator to review the estimated impact of a proposed CDN rules change. By preventing inadvertent CDN rules changes from being deployed, incorrect cached responses can be prevented from being returned and thereby causing service and/or user interface outages and/or errors. Accordingly, the systems and methods described herein may improve CDN caching technology and computer networking technology.

Figure 3:
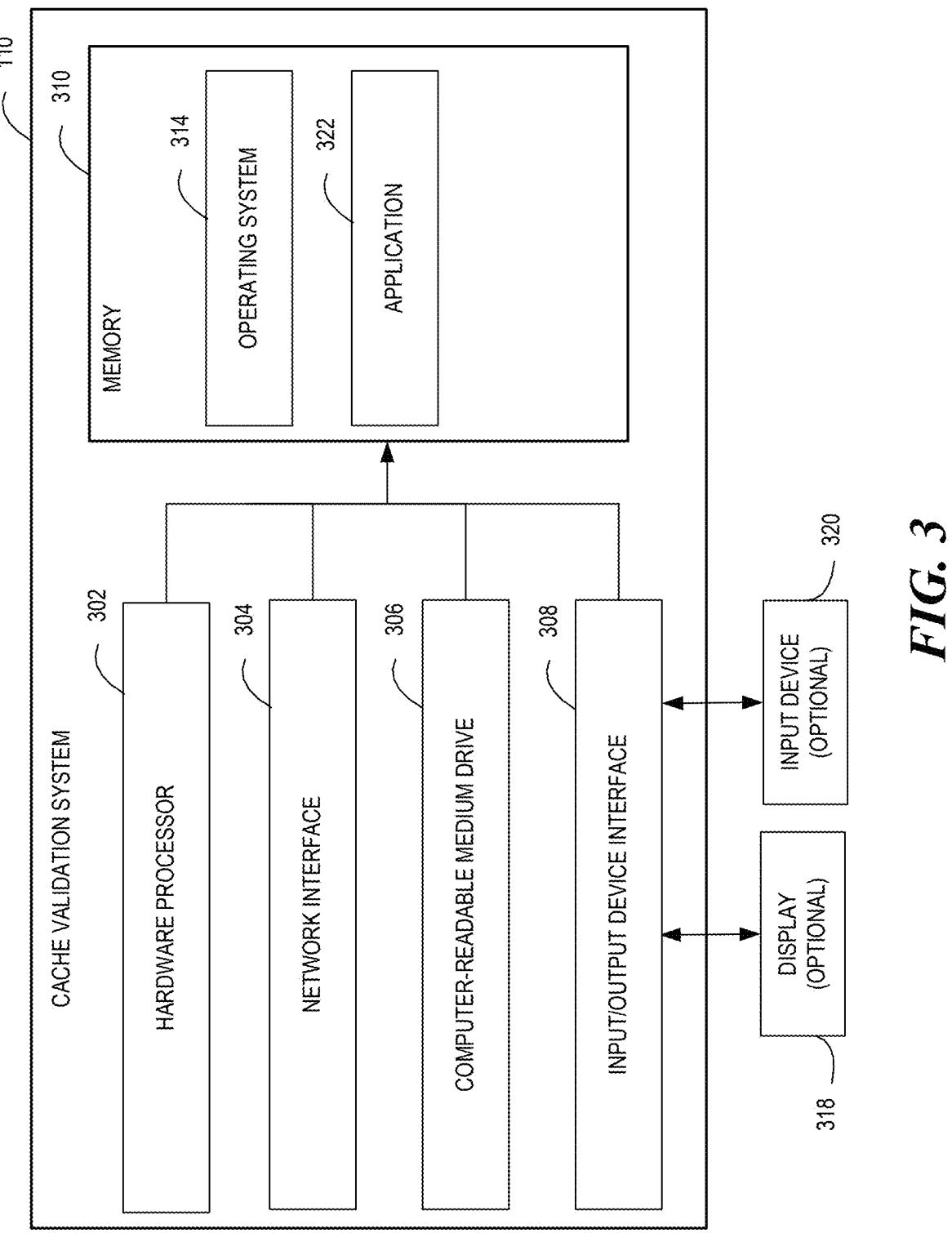
FIG. 3 is a schematic block diagram depicting an illustrative general architecture of the cache validation system referenced in the environment depicted in FIG. 1.

FIG. 3 is a schematic diagram of an illustrative general architecture of the cache validation system 110 referenced in the environment 100 in FIG. 1. The cache validation system 110 can include an arrangement of computer hardware and software components that may be used to execute the application 322. The general architecture of FIG. 3 can be used to implement other devices described herein, such as the client computing device 102 and/or the control plane 120 referenced in FIG. 1. The cache validation system 110 may include more (or fewer) components than those shown in FIG. 3. Further, other computing systems described herein may include similar implementation arrangements of computer hardware and/or software components.

The cache validation system 110 may include a hardware processor 302, a network interface 304, a non-transitory computer-readable medium drive 306, and an input/output device interface 308, all of which may communicate with one another by way of a communication bus. As illustrated, the cache validation system 110 is associated with, or in communication with, an optional display 318 and an optional input device 320. The network interface 304 may provide the cache validation system 110 with connectivity to one or more networks or computing systems. The hardware processor 302 may thus receive information and instructions from other computing systems or services via the network. The hardware processor 302 may also communicate to and from memory 310 and further provide output information for an optional display 318 via the input/output device interface 308. The input/output device interface 308 may accept input from the optional input device 320, such as a keyboard, mouse, digital pen, and/or touch screen. The input/output device interface 308 may also output audio data to speakers or headphones (not shown).

The memory 310 may contain specifically configured computer program instructions that the hardware processor 302 executes in order to implement one or more embodiments described herein. The non-transitory computer-readable medium drive 306 can store the computer program instructions. The memory 310 generally includes RAM, ROM and/or other persistent or non-transitory computer-readable storage media. The memory 310 may store an operating system 314 that provides computer program instructions for use by the hardware processor 302 in the general administration and operation of the cache validation system 110.

The memory 310 may include the application 322 that may be executed by the hardware processor 302. In some embodiments, the application 322 may implement various aspects of the present disclosure. In some embodiments, the application 322 can receive CDN caching rules and redacted request logs; the application 322 can generate test requests; the application 322 can determine cache validation indicators, such as, but not limited to, a hit-to-miss value, for both pre- and post-CDN rules change; the application 322 can generate and transmit a notification (such as the test results and/or an alert) based at least in part on the cache validation indicators.

Figure 4A:
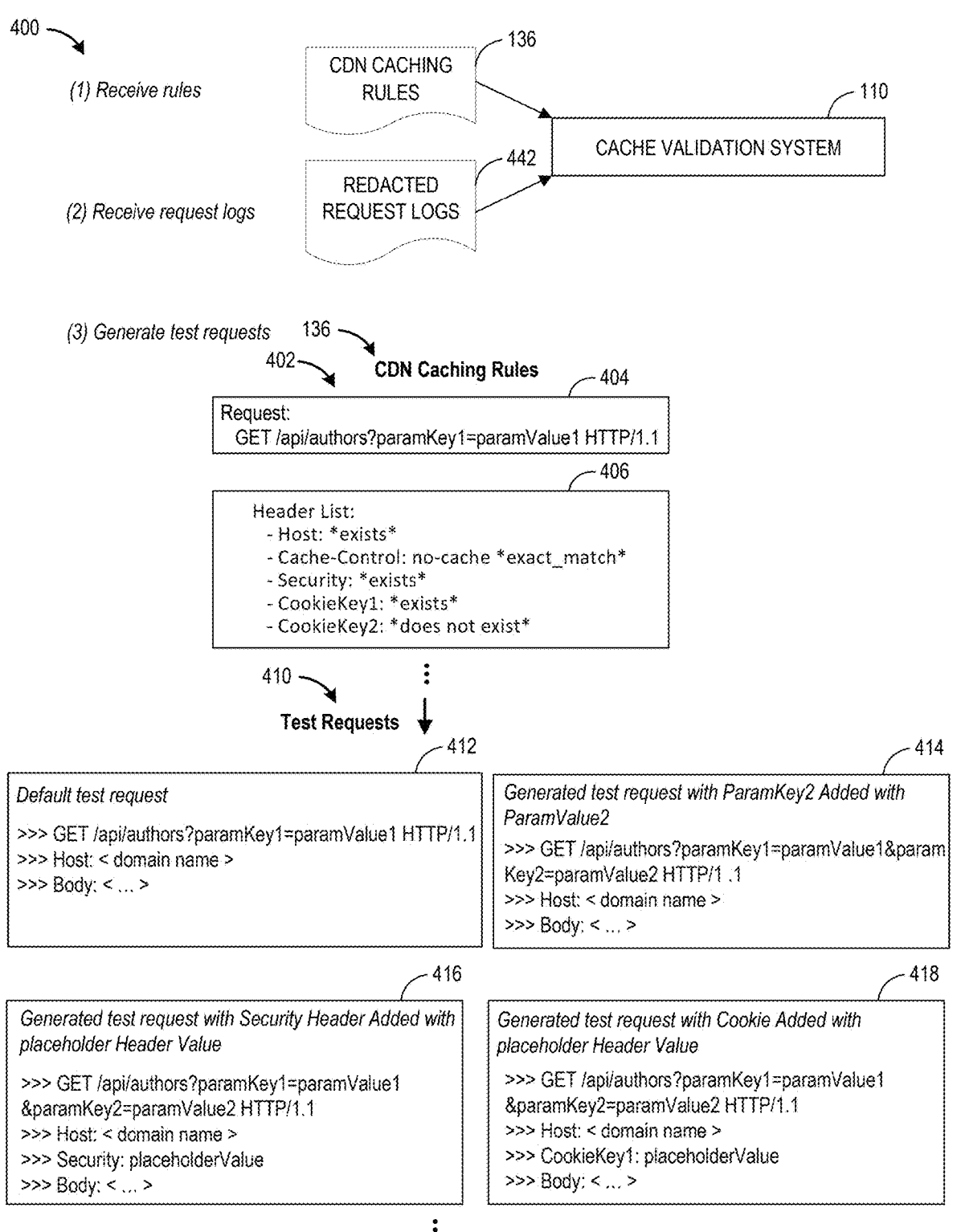
FIGS. 4A-4B are schematic block diagrams depicting a method for validating a proposed CDN caching rules change.
Figure 4B:
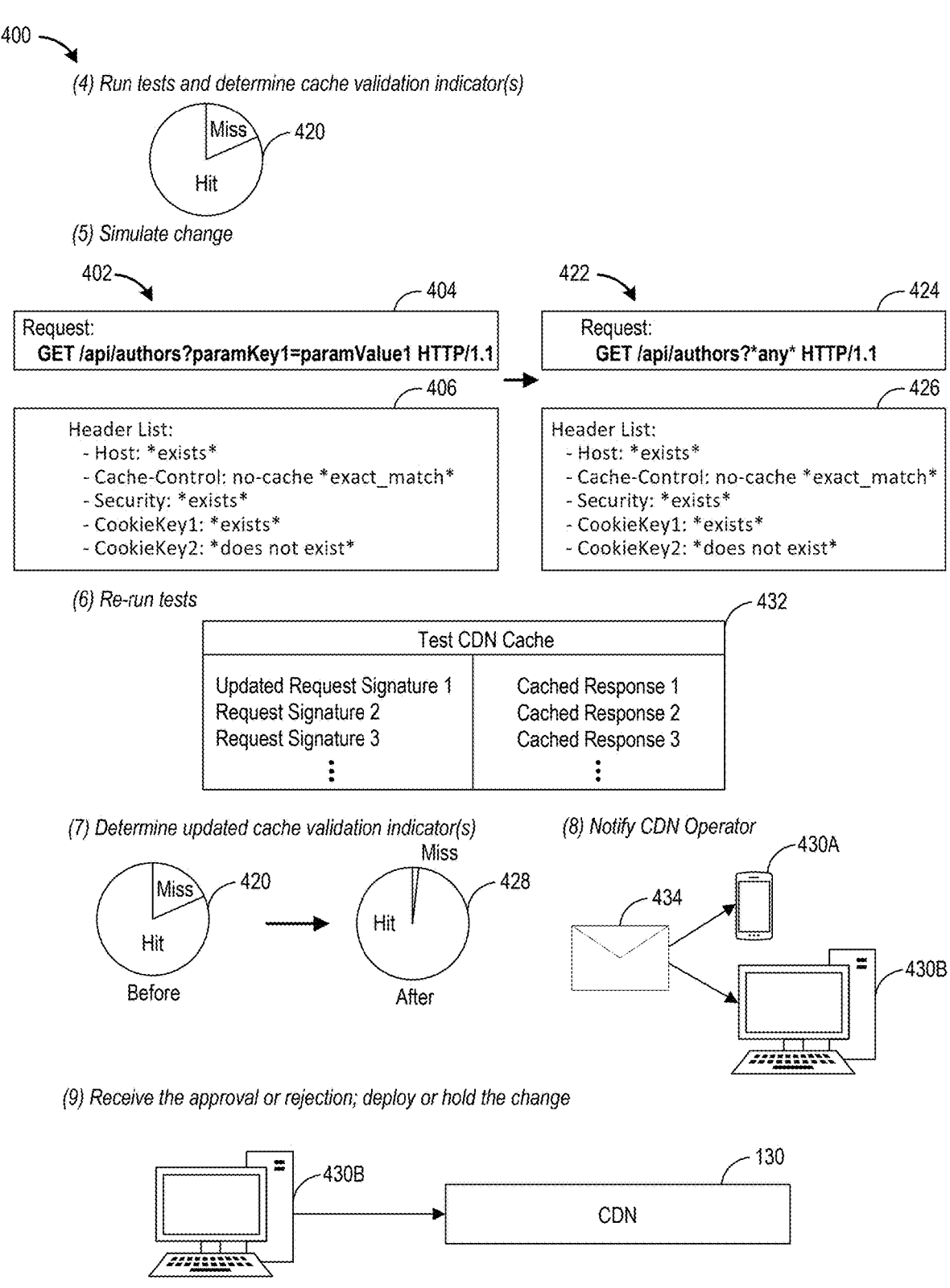

FIGS. 4A-4B are schematic block diagrams depicting a method 400 for validating a proposed CDN caching rules change. In FIG. 4A, the method 400 begins at one (1). At one (1), the cache validation system 110 can receive CDN caching rules 136. At two (2), the cache validation system 110 can receive redacted request logs 442.

At three (3), the cache validation system 110 can generate test requests 410. The cache validation system 110 can generate the test requests 410 based at least in part on the CDN caching rules 136 and the redacted request logs 442. As shown, the CDN caching rules 136 can include a first CDN caching rule 402. The first CDN caching rule 402 can include a first component 404, which can include a path and a query string (here "/api/authors?paramKey1=paramValue1"). The first CDN caching rule 402 can include a second component 406, which can include header parameters, such as, but not limited to, a host parameter, a cache control parameter, a security parameter, and/or cookie parameters. The first CDN caching rule 402 (with the first component 404 and the second component 406) can define a matching request. For example, if an input request matches the request signature of the first CDN caching rule 402 (such as by matching path, query string, and header parameters), then the CDN cache 122 can be checked for the request signature (which can also be referred to as a cache key).

The cache validation system 110 can begin with the redacted request logs 442 and, for each request log, generate one or more corresponding test requests. For example, the cache validation system 110 can generate a first test request 412 from a first request log entry in the redacted request logs 442. In some cases, the cache validation system 110 can generate the first test request 412 without making any changes to the first request in the redacted request logs 442. The cache validation system 110 can generate second, third, and fourth test requests 414, 416, 418. The cache validation system 110 can generate second, third, and fourth test requests 414, 416, 418 via starting from a request log entry in the redacted request logs 442, generating permutations of test requests with the CDN caching rules 136, and inserting placeholder value(s), where applicable. For example, the cache validation system 110 can generate a second test request 414 from a request log entry in the redacted request logs 442 and a CDN caching rule (here by adding a second query string parameter with a parameter value). The cache validation system 110 can generate a third test request 416 from a request log entry in the redacted request logs 442 and a CDN caching rule (here by adding a security header with a placeholder value). The cache validation system 110 can generate a fourth test request 418 from a request log entry in the redacted request logs 142 and a CDN caching rule (here by adding a cookie with a placeholder value). The cache validation system 110 can generate additional test requests from the CDN caching rules 136 and the redacted request logs 442. Inserting placeholder values into redacted test requests can advantageously allow cache simulation. For example, the exact value of security header doesn't need to be known. Instead, for a test simulation, a request can be matched with a cache key with a particular placeholder value.

In FIG. 4B, at four (4), the cache validation system 110 can run tests with the generated test requests and execute a test CDN cache with the CDN caching rules 136. For example, the cache validation system 110 determines a request signature (also referred to as a cache key) for a first test request, and without a cached response in the test CDN cache, there is a cache miss, and a simulated cached response is added to the test CDN cache. Later, the cache validation system 110 determines a subsequent request signature for a subsequent test request, and with a cached response in the test CDN cache, there is a cache hit, and so forth. The cache validation system 110 can determine a cache validation indicator, such as, but not limited to, a hit-to-miss ratio 420 for the first test execution. For example, the hit-to-miss ratio 420 can be twenty (20) percent misses and eighty (80) percent hits. In some embodiments, the cache validation system 110 can determine a cache validation indicator for each request signature (also referred to as a cache key) and/or CDN caching rule.

At five (5), the cache validation system 110 can simulate a proposed change to the CDN caching rules 136. As shown, the cache validation system 110 can update the first caching rule 402 to an updated CDN caching rule 422, which includes components 424, 426. As shown in bold, in the first component 404 of the first caching rule 402, a request matches on a particular query string (here "paramKey1=paramValue1"). As shown in bold, in contrast to the first component 404 of the first caching rule 402 that matches on a particular query string, in the first component 424 of the updated CDN caching rule 422, a request matches on any query string (here "*any*"). Accordingly, as shown in bold, the first caching rule 402 can specify that the cache key lookup matches on specific query string parameters and the first component 424 of the updated CDN caching rule 422 can specify that the cache key lookup matches on any query string parameters.

At six (6), the cache validation system 110 can run tests with the generated test requests and execute the test CDN cache 432 with the CDN caching rules 136 with the proposed CDN caching rule 422. As shown, the cache validation system 110 determines an updated request signature according to the updated CDN caching rule 422, which is reflected in the test CDN cache 432. The cache validation system 110 can process multiple generated test requests, the updated CDN caching rules 136, and the test CDN cache 432.

At seven (7), the cache validation system 110 can determine a cache validation indicator, such as, but not limited to, an updated hit-to-miss ratio 428 for the second test execution. For example, the updated hit-to-miss ratio 428 can be two (2) percent misses and ninety-eight (98) percent hits. In some embodiments, the cache validation system 110 can determine a cache validation indicator for each request signature and/or CDN caching rule. As described herein, the change in cache validation indicator(s) can indicate that there may be unexpected behavior in response to the proposed caching rule change. For example, if query string parameters are being ignored, then the hits in the hit-to-miss ratio may be significantly higher for a particular request signature and/or CDN caching rule, thereby indicating a potential issue.

At eight (8), the cache validation system 110 can provide a notification 434 to user computing devices 430A, 430B, which can be reviewed by a CDN operator. In some embodiments, the notification 434 can include the test results. Additionally or alternatively, the cache validation system 110 can apply a threshold to the cache validation indicator(s). If the cache validation system 110 satisfies a threshold (such as changing X percent or X standard deviations), then the cache validation system 110 can issue the notification 434, which can include an alert.

At nine (9), in some embodiments, the CDN operator can approve or reject the proposed caching rules change via the user computing device 430B. The approval or rejection can cause the CDN 130 to either deploy or not deploy, respectively, the proposed caching rules change.

FIG. 5 includes a flow chart depicting a computer-implemented method 500 for validating proposed updates to CDN caching rules for a CDN cache. The method 500 can enable the detection of errors in CDN caching rules before they are deployed, which can be an improvement over some existing systems. As described herein, the method 500 can prevent CDN caching rules from being deployed and causing unexpected behavior in existing client applications, such as user interfaces. As described herein, the cache validation system 110 may include the application 322 that may implement aspects of the method 500.

Beginning at block 502, CDN caching rules can be received. In some embodiments, the cache validation system 110 can receive CDN caching rules from the CDN 130. As described herein, a CDN caching rule can be a configuration that affects a hit-to-miss ratio of a CDN cache. As described herein, a CDN caching rule can be a policy that controls the values (such as query strings, HTTP headers, cookies, etc.) that are included in the cache key. The CDN caching rule can include at least one of a path, a query string parameter, a header parameter, a security parameter, or a cookie parameter. A cache key can be a unique identifier for every object (such as a response) in the cache, and it can determine whether a request results in a cache hit. A cache hit occurs when a request generates the same cache key as a prior request, and the object for that cache key is in the cache and valid. When there is a cache hit, the object can be served to the client computing device 102. In some embodiments, a default CDN caching rule can cause a default cache key to include a domain name and a resource locator path for the requested object.

At block 504, a proposed CDN caching rules change can be received. The cache validation system 110 can receive a proposed CDN caching rules change. For example, a team managing the CDN 130 can propose making a change to the CDN caching rules, such as a change that omits including query strings into cache keys. In an improved workflow, proposed CDN caching rules changes can be submitted and received by the cache validation system 110. Additional details regarding CDN caching rules changes are described herein, such as with respect to FIG. 2.

At block 506, a request log can be received. In some embodiments, the cache validation system 110 can receive request logs from a monitoring service 140. As described herein, the monitoring service 140 can monitor the requests that the CDN 130 receives from client computing devices 102. The monitoring service 140 can record those requests in request logs. The request logs can be redacted. The monitoring service 140 can store redacted request logs to preserve confidentiality (such as by not recording all the request parameters). For example, the monitoring service 140 can store redacted values for security headers, cookie values, etc., in the redacted request logs. A request log can include log entry, which includes a redacted parameter value. The request logs can include data associated with requests (such as HTTP requests), such as, but not limited to, domain names, resource locators, paths, query strings, host headers, and/or an HTTP body. In some embodiments, the cache validation system 110 can receive request logs for a period of time (such as logs that cover a twenty-four (24) hour period). Additionally or alternatively, the cache validation system 110 can split request logs into smaller logs. Additional details regarding request logs are described herein, such as with respect to FIG. 4A.

At block 508, test requests can be generated. The cache validation system 110 can generate test requests based at least in part on the CDN caching rule(s) and the request log. The cache validation system 110 can generate a test request from a log entry. The cache validation system 110 can add, to the test request, at least one of a query string parameter, a header parameter, a security parameter, or a cookie parameter. The cache validation system 110 can generate a test request with the path and the query string (such as "/api/authors?paramKey1=paramValue1") from a first log entry. A CDN caching rule can include a path with a second query string parameter and/or a wildcard query string parameter (such as "*any*"). Accordingly, the cache validation system 110 can modify the test request by adding a second query string parameter (such as "/api/authors?paramKey1=paramValue1&paramKey2=paramValue2"). As another example, the CDN caching rule can include a security header and/or a cookie header. Accordingly, the cache validation system 110 can modify the test request by adding security header (such as "Security: placeholderValue") and/or a cookie header (such as "CookieKey1: placeholderValue"). The cache validation system 110 can modify the test request by adding parameters with placeholder values, which can match the corresponding CDN caching rule. In some embodiments, the log entry can include redacted parameter values and the cache validation system 110 generate a test request from the log entry. Also, as described herein, the cache validation system 110 can replace, in the test request, the redacted parameter value with a placeholder value. Additional details regarding generating test requests are described herein, such as with respect to FIG. 4A.

The cache validation system 110 can generate different permutations of test requests from the CDN caching rules. In some embodiments, if a CDN caching rule has N parameters, the cache validation system 110 can generate different permutations of test requests based at least in part on the CDN caching rule N choose 1 permutations, N choose 2 permutations, and so forth until N choose K permutations. In some embodiments, the cache validation system 110 can determine different test permutations based at least in part on a test request configuration setting. The cache validation system 110 can receive a test request configuration setting associated with the at least one of a query string parameter, a header parameter, a security parameter, or a cookie parameter. The cache validation system 110 can generate, based at least in part on the test request configuration setting, a set of test requests with different permutations for at least one of the query string parameter, the header parameter, the security parameter, or the cookie parameter. The cache validation system 110 can generate the test requests based at least in part on a tree data structure and/or a search algorithm. Based at least in part on the test request configuration setting, an algorithm can explore the query string branch of the tree for a first number of levels (which can be a first configuration setting) while the algorithm can explore the security header branch for a second number of levels (which can be a second configuration setting).

In some embodiments, the cache validation system 110 can generate different permutations of test requests with a randomized tree approach. The randomized tree approach can be analogized to a random forest, which is also known as a random decision forest. The cache validation system 110 can determine a set of features from at least one CDN caching rule. Each parameter from a CDN caching rule (such as a query string parameter, a header parameter, a security parameter, or a cookie parameter) can be a feature. The cache validation system 110 can generate multiple tree data structures starting with a generated test request from an entry in the request log. Each tree data structure is comprised of nodes and each node in the tree data structure represents a decision where a feature is pseudo-randomly or randomly selected. Thus, each tree data structure represents a set of generated test requests. The cache validation system 110 can generate a first tree of test requests from a log entry and a first pseudo-random subset of the features. The cache validation system 110 can generate a second tree of test requests from a log entry and a second pseudo-random subset of the features.

At block 510, initial cache validation indicator(s) (such as a hit-to-miss ratio) can be determined with the test requests. The cache validation system 110 can determine an initial cache validation indicator based at least in part on the test requests, one or more CDN caching rules, and an initial test CDN cache. The cache validation system 110 can apply individual CDN caching rules to each of the test requests until there is a match. The cache validation system 110 can determine a match between a CDN caching rule and a test request; determine a cache key from the CDN caching rule and the test request; and identify a cached response or a cache miss for the cache key in the test CDN cache. The cache validation system 110 can process the test requests and keep track of cache hits and cache misses.

The cache validation system 110 can determine initial cache validation indicator(s) (such as a hit-to-miss ratio) via applying the CDN caching rules to the test requests and identifying caches hits or misses from the test CDN cache. In some embodiments, the cache validation system 110 can determine initial cache validation indicator(s) (such as a hit-to-miss ratio) for each CDN caching rule. The cache validation system 110 can calculate cache hits associated with a particular CDN caching rule; calculate cache misses associated with the particular CDN caching rule; and calculate a hit-to-miss ratio from the cache hits and the cache misses. In some embodiments, the cache validation system 110 can determine initial cache validation indicator(s) (such as a hit-to-miss ratio) for the test CDN cache as a whole. The cache validation system 110 can calculate cache hits associated with the set of CDN caching rules; calculate cache misses associated with the set of CDN caching rules; and calculate the hit-to-miss ratio from the cache hits and the cache misses.

In some embodiments, the cache validation system 110 can determine the cache validation indicator(s) from time series. The cache validation system 110 can determine a first hit-to-miss ratio based at least in part on a first time series of the test requests. The first time series of the test requests can be an ordered, chronological subset of the test requests (such as the first one hundred test requests, for example). The cache validation system 110 can determine a second hit-to-miss ratio based at least in part on a second time series of the test requests (such as the next one hundred test requests, for example) and so forth. The cache validation system 110 can determine a cache validation indicator that reflects variance of the hit-to-miss ratios over time.

In some embodiments, the cache validation system 110 can determine the cache validation indicator(s) from reordering the test requests. The cache validation system 110 can shuffle the test requests, which can be done randomly or pseudo-randomly. The cache validation system 110 can determine a first hit-to-miss ratio based at least in part on the test requests in a first order; the cache validation system 110 can determine a second hit-to-miss ratio based at least in part on the test requests in a second order; and so forth. In some embodiments, the cache validation system 110 can determine a cache validation indicator a threshold number of times and reorder the test requests each time. In some embodiments, the cache validation system 110 can generate test requests that are reordered and determine cache validation indicator(s) from time series.

In some embodiments, the cache validation system 110 can determine the cache validation indicator(s) with the randomized tree approach. As described herein, the randomized tree approach can be analogized to a random forest, which is also known as a random decision forest. The cache validation system 110 can determine individual cache validation indicator(s) (such as a hit-to-miss ratio) for each generated tree of test requests. The cache validation system 110 can determine a first hit-to-miss ratio based at least in part on the first tree of test requests. The cache validation system 110 can determine a second hit-to-miss ratio based at least in part on the second tree of test requests. The cache validation system 110 can determine aggregated cache validation indicator(s) by applying a statistical measure (such as an average, median, etc.) to the individual cache validation indicator(s). An aggregated cache validation indicator(s) can include an average hit-to-miss ratio. The cache validation system 110 can combine the first hit-to-miss ratio and the second hit-to-miss ratio into a cache validation indicator.

At block 512, the proposed CDN caching rule change can be applied. The cache validation system 110 can apply the proposed change to a CDN caching rule in the test environment. As described herein, an example change to a CDN caching rules can include changing a CDN caching rule that causes query strings to be omitted from the cache key, which can be an error for applications that rely on query strings. The cache validation system 110 can apply any other proposed change to a CDN caching rule.

At block 514, updated cache validation indicator(s) (such as a hit-to-miss ratio) can be determined with the test requests. The cache validation system 110 can determine an updated cache validation indicator based at least in part on the test requests, one or more updated CDN caching rules, and a second test CDN cache. The block 514 for determining updated cache validation indicator(s) can be similar to the previous block 510 for determining initial cache validation indicator(s). The cache validation system 110 can apply individual CDN caching rules (including the updated CDN caching rule) to each of the test requests until there is a match. The cache validation system 110 can process the test requests and keep track of cache hits and cache misses. As described herein, the updated cache validation indicator(s) can be for an individual CDN caching rule and/or multiple CDN caching rules. If the updated CDN caching rule causes different test CDN cache behavior, then, in some instances, the updated cache validation indicator(s) can reflect the changed behavior.

At block 516, test results, which can include the initial and updated cache validation indicator(s), can be provided. In some embodiments, the cache validation system 110 can make the test results available. A user interface of the cache validation system 110 can present the results. In some embodiments, the cache validation system 110 can provide notifications of the test results. The cache validation system 110 can run tests in batches and provide notifications when the tests are complete. In some embodiments, the cache validation system 110 can provide notifications if a threshold is satisfied.

At block 518, it can be determined whether a threshold is satisfied based at least in part on the initial and updated cache validation indicator(s). The cache validation system 110 can compare the initial and updated cache validation indicator(s). For example, if the difference between the hit-to-miss ratio before the proposed change and the hit-to-miss ratio after the proposed change satisfies a threshold, such as a threshold percentage and/or standard deviation, then the method 500 can proceed to block 522 to send a notification. Otherwise, the method can proceed to block 520 to not send a notification.

At block 522, a notification (such as an alert) can be sent. The cache validation system 110 can provide, to a user computing device, a notification associated with the proposed change to the CDN caching rule. A CDN operator can then review the initial and updated cache validation indicator(s) and make a determination whether to proceed with deploying the change or to hold the proposed change from being deployed. A CDN operator, via the user computing device, can accept or reject the proposed change.

At block 524, it can be determined whether the proposed change should be deployed or not. In some embodiments, if the CDN operator approves, then the method 500 proceeds to block 528 to deploy the CDN caching rules change to the CDN 130. Otherwise, the method proceeds to block 526 to hold the change. As described herein, holding the CDN rules change can advantageously prevent errors and/or outages in client applications, such as user interfaces.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
receiving a first Content Delivery Network (CDN) caching rule and a proposed change to a second CDN caching rule;
receiving a request log associated with a plurality of requests received by a CDN;
generating a plurality of test requests based at least in part on the first CDN caching rule and the request log;

determining a first hit-to-miss ratio based at least in part on the plurality of test requests, the first CDN caching rule, and a first test CDN cache;
applying the proposed change to the second CDN caching rule;
determining a second hit-to-miss ratio based at least in part on the plurality of test requests, the second CDN caching rule, and a second test CDN cache;
determining that a threshold is satisfied based at least in part on the first hit-to-miss ratio and the second hit-to-miss ratio; and
providing, to a user computing device, a notification associated with the proposed change to the second CDN caching rule.

2. The computer-implemented method of claim 1, wherein the first CDN caching rule comprises at least one of: a path, a query string parameter, a header parameter, a security parameter, or a cookie parameter.

3. The computer-implemented method of claim 1, wherein determining the first hit-to-miss ratio further comprises:
determining a match between the first CDN caching rule and a first test request from the plurality of test requests;
determining a cache key from the first CDN caching rule and the first test request; and
identifying a cached response for the cache key in the first test CDN cache.

4. The computer-implemented method of claim 1, wherein determining the first hit-to-miss ratio further comprises:
applying, from a plurality of CDN caching rules, individual CDN caching rules to a first test request until there is a match;
determining a cache key from a matching CDN caching rule and the first test request; and
identifying a cache miss for the cache key in the first test CDN cache.

5. The computer-implemented method of claim 1, wherein determining the first hit-to-miss ratio further comprises:
calculating cache hits associated with the first CDN caching rule;
calculating cache misses associated with the first CDN caching rule; and
calculating the first hit-to-miss ratio from the cache hits and the cache misses.

6. The computer-implemented method of claim 1, wherein determining the first hit-to-miss ratio further comprises:
calculating cache hits associated with a plurality of CDN caching rules;
calculating cache misses associated with the plurality of CDN caching rules; and
calculating the first hit-to-miss ratio from the cache hits and the cache misses.

7. A system comprising:
a data storage medium; and
one or more computer hardware processors in communication with the data storage medium, wherein the one or more computer hardware processors are configured to execute computer-executable instructions to at least:
receive a first Content Delivery Network (CDN) caching rule and a proposed change to a second CDN caching rule;
receive a request log associated with a plurality of requests received by a CDN;

generate a plurality of test requests based at least in part on the first CDN caching rule and the request log;

determine a first cache validation indicator based at least in part on the plurality of test requests, the first CDN caching rule, and a first test CDN cache;

apply the proposed change to the second CDN caching rule;

determine a second cache validation indicator based at least in part on the plurality of test requests, the second CDN caching rule, and a second test CDN cache;

determine that a threshold is satisfied based at least in part on the first cache validation indicator and the second cache validation indicator; and provide, to a user computing device, a notification associated with the proposed change to the second CDN caching rule.

8. The system of claim 7, wherein the request log comprises a first log entry comprising a redacted parameter value, wherein to generate the plurality of test requests, the one or more computer hardware processors are configured to execute further computer-executable instructions to at least:

generate a test request from the first log entry; and replace, in the test request, the redacted parameter value with a placeholder value.

9. The system of claim 7, wherein the first CDN caching rule comprises at least one of: a query string parameter, a header parameter, a security parameter, or a cookie parameter.

10. The system of claim 9, wherein the request log comprises a first log entry, wherein to generate the plurality of test requests, the one or more computer hardware processors are configured to execute further computer-executable instructions to at least:

generate a test request from the first log entry; and add, to the test request, the at least one of the query string parameter, the header parameter, the security parameter, or the cookie parameter.

11. The system of claim 9, wherein the request log comprises a first log entry, wherein to generate the plurality of test requests, the one or more computer hardware processors are configured to execute further computer-executable instructions to at least:

receive a test request configuration setting associated with the at least one of the query string parameter, the header parameter, the security parameter, or the cookie parameter; and generate, based at least in part on the test request configuration setting, a set of test requests with different permutations for the at least one of the query string parameter, the header parameter, the security parameter, or the cookie parameter.

12. The system of claim 7, wherein to determine the first cache validation indicator, the one or more computer hardware processors are configured to execute further computer-executable instructions to at least:

determine a first hit-to-miss ratio based at least in part on a first time series of the plurality of test requests; and determine a second hit-to-miss ratio based at least in part on a second time series of the plurality of test requests.

13. The system of claim 7, wherein to determine the first cache validation indicator, the one or more computer hardware processors are configured to execute further computer-executable instructions to at least:

determine a first hit-to-miss ratio based at least in part on the plurality of test requests in a first order; and determine a second hit-to-miss ratio based at least in part on the plurality of test requests in a second order.

14. A system comprising:

a data storage medium; and one or more computer hardware processors in communication with the data storage medium, wherein the one or more computer hardware processors are configured to execute computer-executable instructions to at least:

receive a first Content Delivery Network (CDN) caching rule and a proposed change to a second CDN caching rule;

receive a request log associated with a plurality of requests received by a CDN;

generate a plurality of test requests based at least in part on the first CDN caching rule and the request log;

determine a first cache validation indicator based at least in part on the plurality of test requests, the first CDN caching rule, and a first test CDN cache;

apply the proposed change to the second CDN caching rule;

determine a second cache validation indicator based at least in part on the plurality of test requests, the second CDN caching rule, and a second test CDN cache; and provide, to a user computing device, a test result based at least in part on the first cache validation indicator and the second cache validation indicator.

15. The system of claim 14, wherein the test result comprises the first cache validation indicator and the second cache validation indicator.

16. The system of claim 14, wherein the request log comprises a first log entry, wherein to generate the plurality of test requests, the one or more computer hardware processors are configured to execute further computer-executable instructions to at least:

determine a plurality of features from at least the first CDN caching rule;

generate a first tree of test requests from the first log entry and a first pseudo-random subset of the plurality of features; and generate a second tree of test requests from the first log entry and a second pseudo-random subset of the plurality of features.

17. The system of claim 16, wherein to determine the first cache validation indicator, the one or more computer hardware processors are configured to execute further computer-executable instructions to at least:

determine a first hit-to-miss ratio based at least in part on the first tree of test requests;

determine a second hit-to-miss ratio based at least in part on the second tree of test requests; and combine the first hit-to-miss ratio and the second hit-to-miss ratio into the first cache validation indicator.

18. The system of claim 14, wherein the first CDN caching rule comprises at least one of: a query string parameter, a header parameter, a security parameter, or a cookie parameter.

19. The system of claim 18, wherein the request log comprises a first log entry, wherein to generate the plurality of test requests, the one or more computer hardware processors are configured to execute further computer-executable instructions to at least:

generate a test request from the first log entry; and add, to the test request, the at least one of the query string parameter, the header parameter, the security parameter, or the cookie parameter.

20. The system of claim 18, wherein the request log comprises a first log entry, wherein to generate the plurality of test requests, the one or more computer hardware processors are configured to execute further computer-executable instructions to at least:

receive a test request configuration setting associated with the at least one of the query string parameter, the header parameter, the security parameter, or the cookie parameter; and generate, based at least in part on the test request configuration setting, a set of test requests with different permutations for the at least one of the query string parameter, the header parameter, the security parameter, or the cookie parameter.

\* \* \* \* \*